United States Patent [19]

Grundy

[11] Patent Number: 5,291,598
[45] Date of Patent: Mar. 1, 1994

[54] METHOD AND SYSTEM FOR DECENTRALIZED MANUFACTURE OF COPY-CONTROLLED SOFTWARE

[76] Inventor: Gregory Grundy, 1/21 Hewitt Street, Wilston 4051, Queensland, Australia

[21] Appl. No.: 864,836

[22] Filed: Apr. 7, 1992

[51] Int. Cl.⁵ .......................... G06F 9/00; G06F 12/14
[52] U.S. Cl. ............... 395/650; 364/DIG. 1; 364/286.4; 364/286.5; 364/286.6
[58] Field of Search .......... 395/650; 364/286.4, 364/286.5, 286.6

[56] References Cited

U.S. PATENT DOCUMENTS

| | | | |
|---|---|---|---|
| 4,652,990 | 3/1987 | Pailen et al. | 364/200 |
| 4,685,055 | 8/1987 | Thomas | 364/200 |
| 5,034,980 | 7/1991 | Kubota | 380/4 |
| 5,113,518 | 5/1992 | Durst et al. | 395/550 |

*Primary Examiner*—Gareth D. Shaw
*Assistant Examiner*—A. Katbab
*Attorney, Agent, or Firm*—Kenyon & Kenyon

[57] ABSTRACT

A system to control the use of an informational product is disclosed. The informational product is stored on a storage medium and executed by a first processor. The informational product is operatable in a plurality of modes. The system comprises three manufacture modules. The first manufacture module, executed by the first processor, generates a registration code for a user of the informational product, the registration code being a function of the identity of the first processor, the identity of the user and the identity of the informational product. The second manufacture module, executed by the first processor, accepts as input an authorization code, verifies the authorization code and, if the verification is successful, changes the operational mode of the informational product. The second manufacture module also stores a user record in the informational product. The third manufacture module examines the user record each time the informational product is activated. The third module determines the operational mode of the informational product as a function of the operational mode stored in the user record and the identity of the processor on which the third module is executed. The third module returns to the informational product the user record.

43 Claims, 11 Drawing Sheets

PROCESS OVERVIEW

FIG. 3 AUTHORIZATION PROCESS

GET USER DATA MODULE

GENERATE REGISTRATION CODE MODULE

PRIME BACKUP MODULE

FRANKING PROCESS

DEVELOPER MODULES

SCHEMATIC OF CENTRAL DATABASE

METHOD AND SYSTEM FOR DECENTRALIZED MANUFACTURE OF COPY-CONTROLLED SOFTWARE

FIELD OF INVENTION

The present invention is directed to a computer based method and apparatus to control the distribution of information, and more particularly, a method and apparatus whereby a user of computer software becomes the primary agent of manufacture and distribution of the software under the direct monitoring and control of a centralized control point.

BACKGROUND OF THE INVENTION

Traditionally, computer software is manufactured and distributed through a system where a developer creates software (by designing a solution to a problem and coding that solution), manufactures the software in mass at a production facility, packages the software and then distributes it to the consumer. The software, in the form of computer code, is stored on a secondary storage device, such as a disk. Software products are generally manufactured by copying the computer code to the required number of storage devices. In a normal distribution chain, the consumer, who may be a purchaser or licensee, generally acquires the software (i.e., a storage device containing a copy of the computer code) from wholesale or retail dealers who in turn have acquired the software from the manufacturer.

A problem with the traditional system for the manufacture and distribution of computer software is that each software developer has its own substantial production, packaging and transportation costs, plus fixed overhead costs for facilities and personnel. When added to the initial investment required to develop software, such costs often make the launching of a new product prohibitive for the developer, especially where the developer is an individual or small corporation. Production and distribution is costly, and these costs are passed on to the consumer by way of higher product prices or fees. Additionally, the developer, where demand for a product is uncertain, may not know how many copies of a piece of software to manufacture and distribute. Production of too many or too few copies results in lost profits.

One approach taken by a segment of the software industry in order to reduce the inherent costs associated with the traditional manufacture and distribution of software is to invite consumer participation through the concept of "shareware" software. Shareware is software available for copying by consumers free of charge or at nominal costs from electronic bulletin boards accessed using modems or through mail order catalogue services. If, after having had an opportunity to use the software for a short period of time, the user decides to keep the software, the user is then under a good faith obligation to register the software and return a fee to the developer or distributor. In practice, the consumer participation in copying and distributing the available software is good, but the honorarium is rarely paid. As a direct consequence of the poor returns to shareware developers in general, the quality of products and level of support is low.

Another and very significant problem facing the manufacturer of computer software is the unauthorized reproduction of software products. Computer software is expensive to design and code, but the duplication of an individual piece of software can be done swiftly and, relative to the initial production costs, at minimal cost. For example, by using operating system commands, a user can simply copy a program from a storage device such as a disk using one of the user's disk drives to another storage device. This illegal copying of software duplicates, on a small scale, a developer's manufacturing process. However, the unauthorized copying of computer software cannot be controlled by the manufacturer and the distribution of authorized copies cannot be traced.

The software manufacturing industry is placed in an unfortunate position. The purchase price of software is relatively high to reflect the cost of design and coding. The consumer is often averse to paying a high price for software, especially for software that cannot be evaluated before purchase (because the manufacturer will not allow access to the software before the purchase to prevent pre-purchase copying), and when the consumer is faced with a low risk of being detected and prosecuted for copying software, there is a strong incentive to make an unauthorized copy of the software. In effect, unlicensed, pirated software competes directly for the same market as legally manufactured software. The lost revenue to the manufacturer is passed on to the consumer via higher purchase prices, further increasing the incentive for piracy. With the current trend in the industry to develop software which has an intuitive, graphical interface, not requiring manuals to operate it, this problem can only increase as users do not require access to difficult to copy instruction manuals and tutorials. Further, pirated software can be quickly and widely distributed over telephone lines using modems.

One approach the industry has taken to improve the return on investment in the manufacture and distribution of software is to attempt to decrease the amount of software piracy. Software developers have used varying copy protection schemes. These schemes generally prevent a user from copying software or using an unauthorized copy of software. Schemes include "dongles", "code-wheels", storing the software on difficult to copy storage devices such as copy protected disks, using enabling access codes provided in user manuals or by the developer that must be entered before the software will work, or using hardware specific validation codes that allow a piece of software to operate only on one identified computer. Alternatively, a software developer could use a hardware copy protection scheme where an access code is supplied by a unique or difficult to copy hardware device able to be attached to only one computer at a time. Typically, when licensed software is not given an access code, the standard practice is for the software to refuse to operate. See, for example, U.S. Pat. No. 4,562,306 (Method and Apparatus for Protecting Computer Software Using an Active Coded Hardware Device) and 4,748,561 (Method of Protecting Computer Software).

Copy protection schemes have not been effective in stemming the tide of piracy, mainly because there are many specialized anti-copy products available to "unlock" the copy protection. Further, some copy protection schemes prevent consumers from legitimately making backup copies of the software for use when the authorized copy fails or is destroyed.

Another approach to prevent piracy of software is to require the authorized user, upon the first start-up of the software, to input the user's name (which is then stored in the software's code) such that the user's name will appear on the initialization screen on each successive re-use in order to identify the user to whom the software is licensed or sold. This practice is intended to discourage authorized software users from allowing their software to be reproduced, knowing that they can be identified readily from an unauthorized copy of the software. However, as the software producer is unlikely to know when the software is illegally copied and is unlikely to be able to track down unauthorized users, such a scheme does not discourage copying. Further, there is no identification of users who pirate pirated software.

An approach to reduce piracy prior to purchase but to allow a potential consumer to test a piece of software is to distribute demonstration software without the full functional features of the software program. This permits the user to sample the user interface and certain features of the software without having to purchase the software product "sight unseen". If the user likes the software, the user can contact the developer or distributor for the fully functional software upon registration and payment of a license fee or the purchase price. The problem with such demonstration software is that twice the number of software products have to be produced and distributed. One or more storage mediums containing software must be produced and distributed for demonstration and one or more storage mediums containing different software must be produced and distributed for full function operation. This increases the costs of production and distribution. Further, the user is inconvenienced by twice having to contact or visit the distributor and is delayed until the full function software is obtained.

One solution to the problem of having to obtain additional fully functional software is to initially provide to the user the full function program but to have only certain files active for demonstration purposes. Then, if the user wants to enable the full function, the user must contact the developer or distributor for registration and payment of the license fee or purchase price in return for an access code. However, once the access code is revealed, unauthorized copies can be made and the access code can be passed on with the unauthorized copy of the software. Therefore, this is not effective protection. Typically the process also requires the overhead of serializing each individual software copy at a central point of manufacture.

As a result of the high overhead costs of the traditional means of manufacture and distribution of software, and the significant level of unauthorized reproduction of software, there is a need in the software industry for a system that takes advantage of the software consumers' ability to manufacture and distribute copies of software using their own equipment while at the same time controlling access to the software so that the person who designed and coded the software receives fees for its use. In other words, there is a need in the industry for a method of manufacture and distribution that invites rather than restricts consumer participation in the manufacture and distribution process but does not reduce the incentive of the original manufacturer to create the software.

Software is not the only product that suffers from these problems. Other developers and distributors in the information industry, such as developers and distributors of databases and other informational products, also have difficulties controlling access to their product where it can be loaded onto a user's own machine. They have a product that individual users find easy to copy and distribute, but which is costly for the developer to initially design, make and efficiently distribute. Developers and distributors of information products desire to harness the user's ability to copy and distribute their product but only where they can obtain a fee for their initial involvement.

As a result, there is a significant and substantial need in the information industry to allow developers to sell their information product to the full potential market efficiently, that encourages and takes advantage of consumer participation in the manufacture and distribution of the information products yet has centralized monitoring and control, that permits consumers to evaluate the product prior to the purchase decision, that effectively combats piracy, and that permits developer profit for funding of support and update services.

SUMMARY OF THE INVENTION

The present invention provides a method and apparatus that monitors and controls the use of information stored on a storage medium. The information, in machine readable form, can be, for example, a computer software program or a database. In the representative embodiment, the information is a software product.

According to the present invention, the software products are created by software developers capable of being operated in two modes. The first mode is a full-function mode, where all the functions and features of the software product are available to the user of the software product. The second mode is an evaluation mode, where only certain functions, decided by the software developer, can be accessed by the user. The evaluation mode allows potential users to try and evaluate features of the software product. Each software product is stored on a storage medium, in the representative embodiment, on disk. On each disk (or set of disks) the software product is capable of being operated in both modes. However, each software product operates in only one mode at a time.

The present invention, in the representative embodiment, involves two computers. A first computer, the user's computer, executes the software product. A second computer, belonging to a Central Authority, contains a database that stores information about software products recognized by the Central Authority and about the users who are authorized to operate software products in full-function mode.

When a new user obtains a disk containing a software product, the software product will operate in the evaluation mode. The new user can freely operate the software in the evaluation mode and make other copies, which will also be in the evaluation mode. If the new user wishes to use the software product in full-function mode, the new user contacts the Central Authority to obtain an authorization code. It is expected that the new user will pay a fee for obtaining the authorization code.

To obtain the authorization code, the new user will conduct, on the user's computer, a registration process. A Get Registration Code Module, a separate executable segment of the software product, produces for the new user a registration code. The registration code is a code made by the Get Registration Code Module based upon, inter alia, the version and identity of the software product, the identity of the user's computer, the identity of the previous user (if any) and data about the new user. (The data about the new user had previously been entered by the user as requested by the software product.)

The new user transmits the registration code to the Central Authority. At the Central Authority, an authorization process takes place. The registration code is decoded by the Central Authority and from the contained information, an authorization code is made. The new user provides user information to the Central Authority, plus a fee, and obtains the authorization code. The new user then enters the authorization code into the user's computer to become an authorized user and the software product will operate in full-function mode. In some cases, for example, when requested by the software producer, the authorization code is able to be used on later versions of the same software product. Thus, the authorization process and conversion to full-function mode takes place at the user's own site. Details of authorized users and from whom authorized users obtain the software product are stored in the Central Authority's database.

After the user enters the authorization code, a Save Ownership Details Module modifies the executable code of the software product. The modification ensures that the software product will operate free of evaluation mode limitations on the user's computer upon which the registration process took place.

Further, a Prime Backup Module ensures that every authorized user holds a backup copy of the software product. The backup copy is in the evaluation mode, and so can be freely be copied for distribution to other potential users, who can register themselves as authorized users as described above. However, the backup copy is such that if the registered user's software product fails, the backup copy (or a copy of the backup copy) can, using the previously obtained authorization code, be converted to full-function mode.

Each time a user starts the software product, a Get User Data Module checks what mode the software product is operating in. It does this by examining an ownership details record stored by the Save Ownership Details Module. If in evaluation mode, the user can access only designated features of the software product, as discussed above. If in full-function mode, the Get User Data Module will check to see if the software product is being used on the user's computer upon which the registration process took place. If it is not, the software product will automatically revert to evaluation mode. When in full-function mode, the authorized user's name is displayed on the screen.

The four modules above, namely the Get User Data Module, the Generate Registration Code Module, the Save Ownership Details Module and the Prime Backup Module are what are referred to as Manufacture Modules.

When the software product is created, the software developer inserts four "dummy" developer modules into the code of the software product. This is called the priming process. The developer modules simulate the operation and interfaces of the Manufacture Modules for testing and development purposes. The developer modules are made freely available by the Central Authority.

As the next step in the creation of the software product, the software product containing the developer modules is transferred to the Central Authority. The Central Authority performs a Franking Process on the software product whereby the four developer modules are replaced with the four Manufacturers Modules. The software product is placed in evaluation mode, copied and distributed in the marketplace and to potential users. Details of the software product are stored in the Central Authority's database. In performing the Franking Process, the Central Authority is not given access to the software product's source code or object modules, preserving confidentiality.

The Manufacture Modules contain computer instructions that encrypt the registration code and decrypt the authorization code which allows the user to operate the software product in full-function mode. Further, computer instructions allow the detection of whether the software product has been tampered with. In the Authorization Process, the Central Authority checks for tampering of the software product to prevent the proliferation of copies of software products that have been corrupted or tampered with.

Many software developers can create software products that contain developer modules and that are capable of being used in two modes. The Central Authority's database is capable of storing information about various software products and various authorized users.

DETAILED DESCRIPTION

Figure 1:
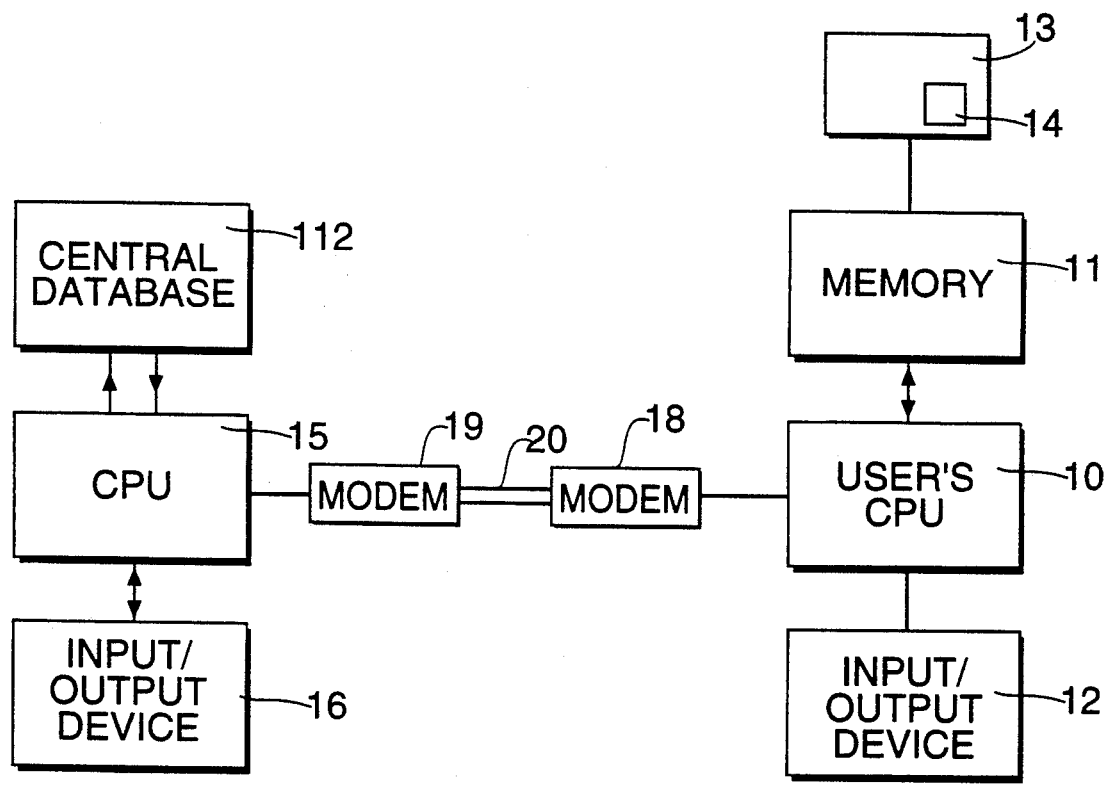
FIG. 1 is a block diagram of an exemplary computer system incorporating the information distribution system of the present invention.

Referring now to the drawings, and initially FIG. 1, there is illustrated in block diagram form an exemplary computer system incorporating the information distribution system of the present invention.

A user's computer processor 10 is coupled to a memory device 11 and an input/output device 12. A secondary storage device 13 contains a copy of an informational product 14. In the representative embodiment, the informational product 14 is a software product, such as a computer program, and the secondary storage device 13 is a disk. The computer program stored on the secondary storage device 13 is loaded onto the memory device 11, or is coupled to the memory device 11 and accessed by the user's computer processor 10. The computer program is executed by the user's computer processor 10.

A Manufacture Control Agency operates a second computer processor 15, coupled to a Central Database 112. An operator (not shown) at the Manufacture Control Agency accesses the Central Database by means of a second input/output device 16 coupled to the second computer processor 15. An Authorization Process 109, as illustrated below in FIG. 1A, is conducted using the second computer processor 15.

The user and the Manufacture Control Agency communicate with each other. In a representative embodiment, the communication takes place via a telephone line 20. The user's computer processor 10 is coupled to a modem 18 which is coupled to the telephone line 20. A second modem 19 is coupled to the second computer processor 15 which is also coupled to the telephone line 20. A registration code (109a FIG. 1A), as determined by the informational product 14 operating on the user's computer processor 10, is communicated to the second computer processor 15 which in response returns an Authorization Code (108b FIG. 1A). The Authorization Code is used to enable the informational product 14 to operate in a fully functional manner, as described below.

Figure 1A:
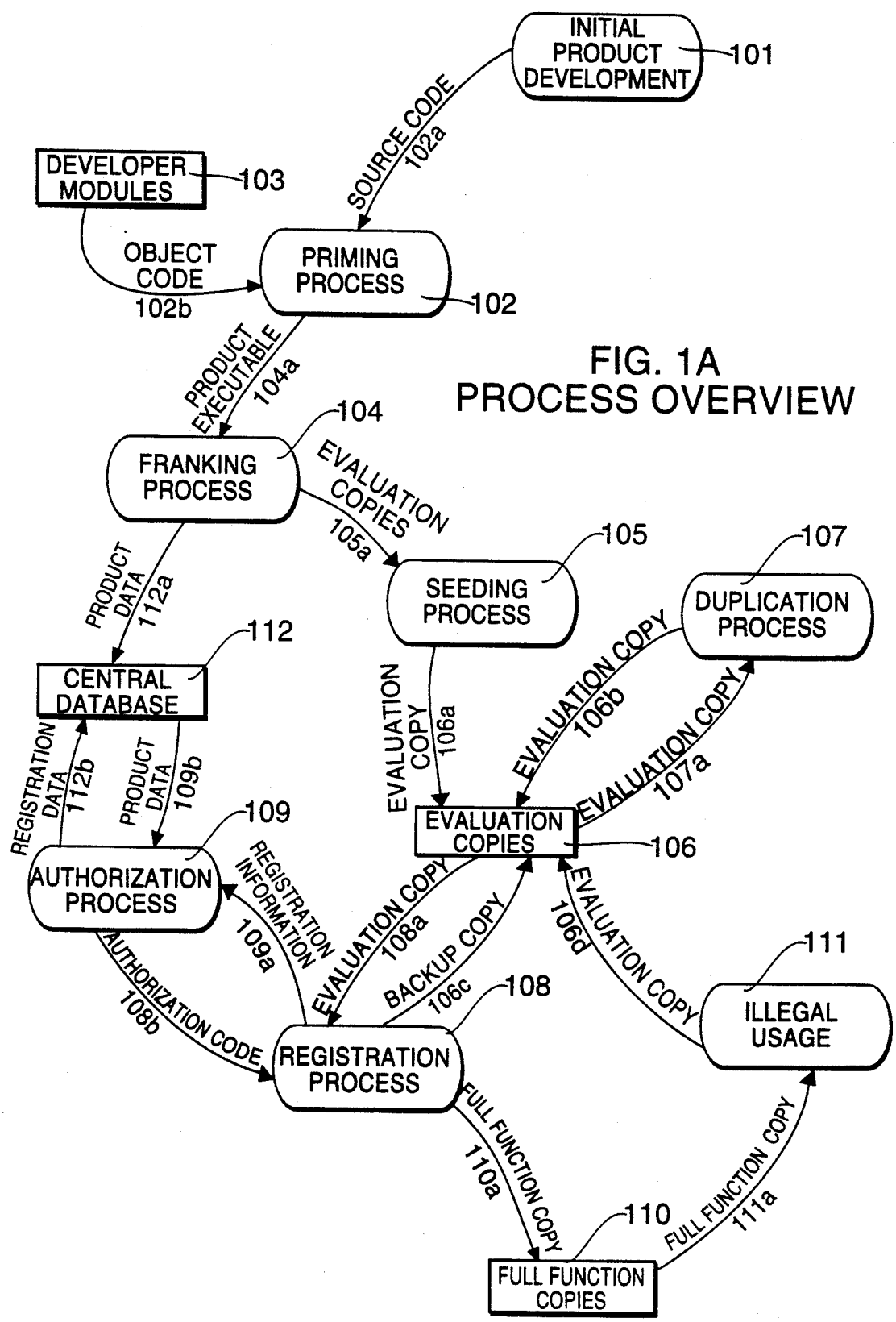
FIG. 1A is a data flow diagram illustrating the overall process of the present invention.

Referring now to FIG. 1A, there is illustrated a data flow diagram showing the various processes of the present invention. The data flow of the present invention is shown in the context of software manufacture and the distribution. However, the present invention is not limited to the manufacture and distribution of software. Other informational products, such as databases, could be the product that is developed and distributed. The diagram shows each component process of the present invention and the inputs and outputs of each process. Each process is shown as an oval labelled and numbered. The inputs to and outputs from the processes are shown as directional lines labelled with a number and a letter.

As input, there is the initial informational product 14 by a developer 101. The informational product 14 could be, for example, a software product, such as a computer program. The software product could be one developed for use and execution on any type of computer and could carry out any application or utility. In a representative embodiment, the informational product 14 is a software product ("the host software product"), which is input as source code into a Priming process 102 of the present invention (102a). The host software product, in the representative embodiment, is stored on the secondary storage device 13 being a disk.

The software developer, before releasing the host software product to users, performs the Priming process 102 on the host software product. The Priming process 102 involves combining the host software product 102a with a set of four Developer Modules 103 in object code 102b, that are supplied by a central Manufacture Control Agency, using an industry standard "Linker".

The Manufacture Control Agency makes the Developer Modules 103 in object code 102b freely and widely available to all developers for inclusion in their host software products 103. The Developer Modules 103 are incorporated into the code of the host software product by the developer. The developer is supplied with a specification of the interface of the Developer Modules 103 so as to be able to carry out such incorporation. The unencrypted nature of the Developer Modules 102b does not compromise the security of the subsequent manufacture and distribution process as the modules are overwritten in a Franking process 104 with a set of encrypted Manufacture Modules. A more detailed description of the Developer Modules 102b is provided below and shown in FIG. 9.

The resultant software product 104a, after completing the priming process 102, is then tested thoroughly before a copy is sent to the central Manufacture Control Agency where the Franking process 104 is conducted.

Franking is a process whereby the Manufacture Control Agency modifies the primed host software product provided by the developer 104a by overwriting the Developer Modules therein with a set of four specifically created Manufacture Modules to create an evaluation mode copy of the host software product. A more detailed description of the Franking process is provided below and shown in FIG. 8.

The Manufacture Modules created during the Franking Process 104 comprise the software instructions necessary to control the steps of getting data about a new user of the host software product and determining the operational mode of the software each time it is used, generating the registration code needed by new users when arranging to convert their copy of the host software product to full-function mode, performing the conversion to full-function mode, and allowing the user to make a primed backup copy of the host software product. The Franking Process 104 generates Manufacture Modules that are customized to each host software product. The Manufacture Modules contain features which provide security against tampering with or corruption of the code of the host software product.

Figure 10:
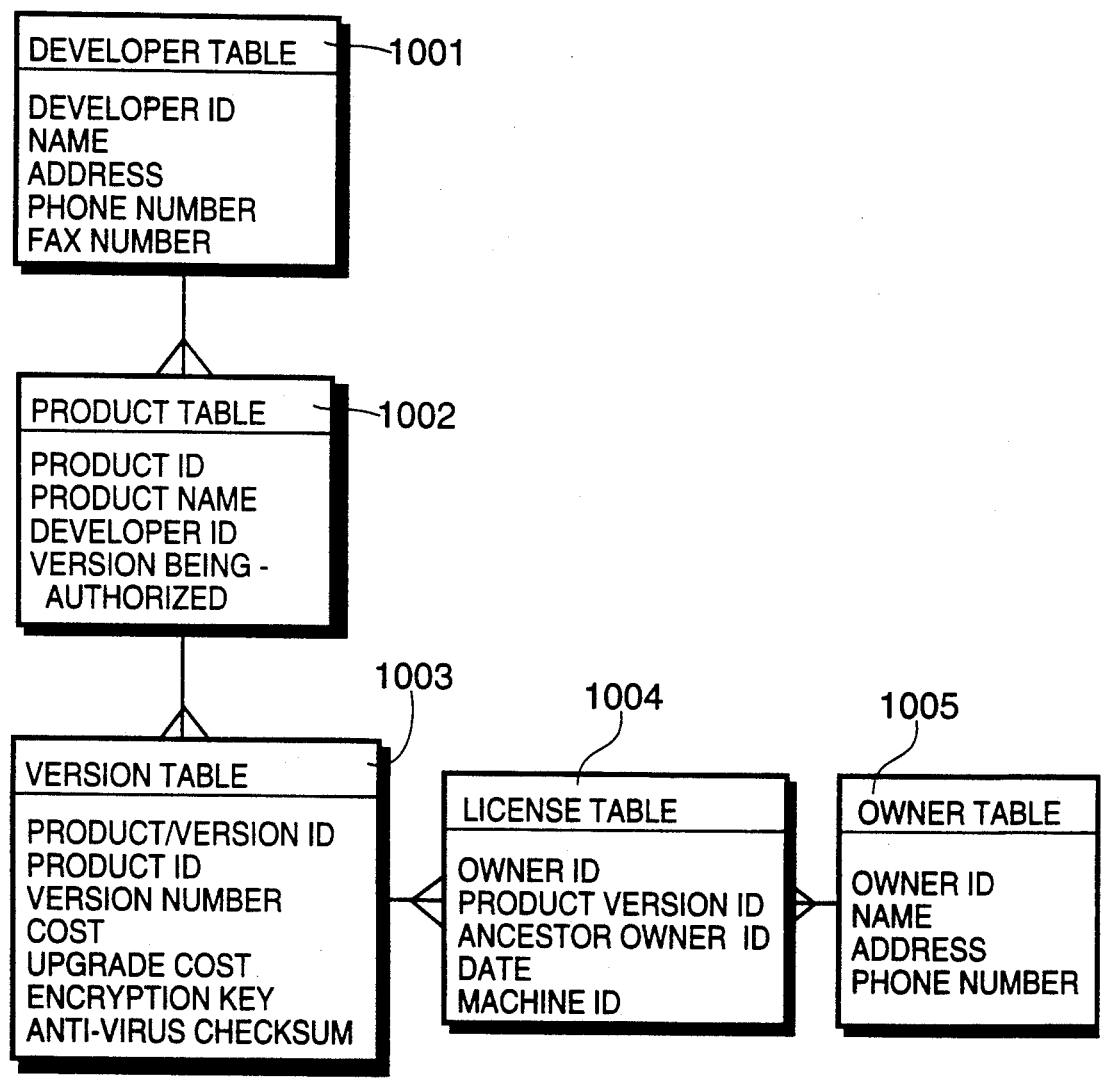
FIG. 10 is an example table structure of the Central Database of FIG. 1A.

Part of the Franking process 104 also involves the storage of information 112a about the software product in the Central Database 112 operated by the Manufacture Control Agency. The Central Database 112 can contain information about numerous host software products from numerous developers. Information 112b is also captured into the Central Database 112 during the authorization process 109 discussed below. The information retained in the Central Database 112 serves three primary purposes. Firstly, data held about each specific host software product is used during the Authorization process 109 when a potential user of the host software product requests authorization to use the software. Secondly, registration data is retained in the Central Database 112 and is used to make payments to the developer for new registrations and to provide the developer with a complete register of the authorized users of its products. Thirdly, genealogical information, obtained in the registration process 112b, is stored in the Central Database 112. The genealogical information is information identifying from which user the newly registered user obtained the software. It can be used as the basis for commercial arrangements which support and encourage the process of duplication and distribution (e.g. through the payment of commissions). The structure of the Central Database 112 is discussed below and is shown in FIG. 10.

After the Franking process 104 is complete, the software 105a can be returned to the developer or to another party for "seeding" of the product into the user community 105. Seeding 105 is accomplished by making evaluation mode copies of the host software product freely available to potential consumers. The distribution of the initial "seed" copies (or distribution copies 106) can be conducted through standard industry distribution channels 106a such as, for example, electronic bulletin boards, Public Domain Libraries, direct mailing, disk-based magazines and compendium laser disks. The seeding process establishes an initial pool of distribution copies 106 of the host software product within the user community.

The distribution copies of the host software product in evaluation mode 106 that are placed into the user community by the seeding process are made available for evaluation purposes only. Copies of the software in evaluation mode do not permit operation beyond that level which is necessary for the software consumer to make an evaluation of the host software product's features prior to making a decision to purchase. However, the host software product does contain all the executable code and ancillary files necessary for the software to operate without any restrictions. That is, the consumer is in fact supplied with a complete copy of the software, but can not operate the software in full-function mode until after the registration process 108, as discussed below, is completed.

The quantity and penetration of the distribution copies 106 within the user community increases as distribution copies 106 of the host software product in evaluation mode (107a) are duplicated 107 and the duplicates 106b are passed between users, each who can evaluate the software and can duplicate the software using their own equipment 107 and pass the duplicated copies 106b to other potential users. This duplication 107 is a process which all consumers of computer software products are familiar and can carry out using their own hardware equipment 10 to 13.

As stated above, the distribution copy 106 of the host software product is a copy of the host software product first given to the user as part of the seeding process 105. It is in evaluation mode. The user will usually copy the distribution copy 106 of the host software product, making an evaluation mode working copy of the host software product. Because the host software product may be stored on the secondary storage device 13 in a compressed form, the user may have to create the working copy by decompressing the distribution copy 106 of the host software product before the host software product can be used. The working copy is a copy of the host software product that the user runs and executes on the user's computer processor 10. For example, the working copy could be loaded onto the memory device 11, such as the user's hard disk drive, and is executed by the user's computer processor 10. The working copy may be in either evaluation mode or full-function mode. (A working copy is to be distinguished from a backup copy of the host software product, which is in evaluation mode. When the user performs a Recover Backup option 225 on the backup copy, as explained below in reference to FIG. 2, the backup copy (or a copy of the backup copy) will be converted to a full-function working copy. The backup copy of the host software product is created during by the Prime Backup process 700, explained below in reference to FIG. 7.)

As people within the user community come into contact with the host software product they will evaluate the host software product and decide on its suitability to their requirements. Should the host software product prove satisfactory and the user wishes to make further use of the host software product the user can undertake the registration process 108 and register a copy of the host software product 108a with the Manufacture Control Agency. The registration process 108 firstly involves an Authorization process 109 whereby the user provides the Manufacture Control Agency with the registration code 109a and receives from the Manufacture Control Agency the Authorization Code 108b. In an exemplary embodiment, the exchange of codes can take place directly between the Manufacture Control Agency's computer processor 15 and the user's computer processor 10, which executes the host software product, via the telephone line 20. The Authorization Code enables the transformation of an evaluation mode copy of the host software product 108a into a full-function mode copy of the host software product 110. The registration process 108 also transforms an evaluation mode copy of the host software product 108a into a backup copy 106c which can still be freely passed to other potential users for their use in evaluation mode. This transformation involves storing an identification number and details of the new user in the distribution copy 106 of the host software product originally given to the user, to make it the backup copy. Thus, if the full-function copy 110a of the host software product fails, a new full-function copy can be made by reactivating the backup copy of the host software product (or a copy of the backup copy) using the same Authorization Code (see steps 226 to 231 of FIG. 2). A more detailed description of the registration process is provided below and shown in FIG. 2, (steps 210 to 224).

Full-function mode copies of the host software product 110 operate without any of the restrictions which apply to evaluation mode copies. Each time the host software product is used in full-function mode, the name and address of the registered user is displayed on a banner page.

Control over the registration process 108 is provided by the Manufacture Control Agency during the Authorization process 109 through the provision of Authorization codes 108b. The Authorization process 109 requires the new product owner to provide information (including the registration code 109a) to the Manufacture Control Agency (See step 216 of FIG. 2). The Authorization process 109 also draws on information 109b about each host software product which is stored in the Central Database 112 and results in the storage of information 112b about the new user in the Central Database 112. A more detailed description of the Authorization process 109 conducted by the Manufacture Control Agency is provided below and shown in FIG. 3.

It should be noted that the registration process 108 and the Authorization Process 109 occur in different physical locations. The registration process 108 is performed using the user's computer processor 10 operating on the host software product. The Authorization Process 109 takes place on the Manufacture Control Agency's computer processor 15 which accesses the Central Database 112.

In the event that the user of the host software product makes a copy of the full-function product available to an unauthorized user 111a, the Manufacture Modules embedded in the host software product contain a mechanism whereby the unauthorized or illegal use 111 of the host software product is detected and the full-function mode copy reverts to an evaluation mode copy 106d. A more detailed description of this process is provided below and shown in FIG. 4, (steps 406 to 411).

Figure 2:
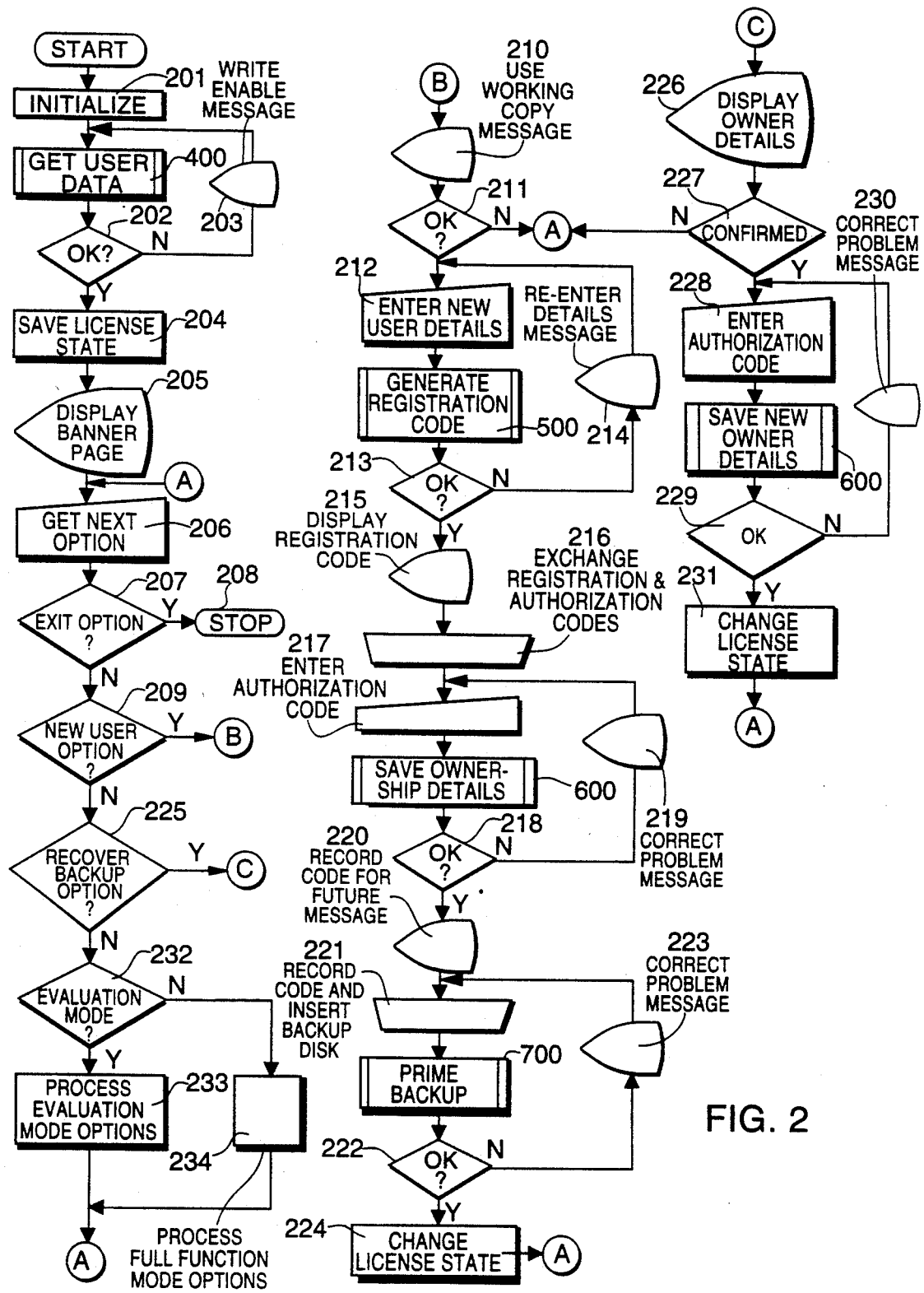
FIG. 2 is a flow chart diagram of the operation of the Manufacture Modules of the present invention and their interaction with the host software product.

Referring now to FIG. 2, there is shown a flow chart diagram illustrating the operation of the four Manufacture Modules and their interaction with the host software product according to the present invention. The Manufacture Modules are incorporated into the host software product during the Franking process 104 of FIG. 1A. The modules are executed by a user's computer processor 10 which has a computer memory 11 capable of storing the host software product and its incorporated Manufacture Modules. The four Manufacture Modules are: (1) a Get User Data Module 400, (2) a Generate Registration Code Module 500, (3) a Save Ownership Details Module 600, and (4) a Prime Backup Module 700 (each depicted in FIG. 2 with double bar sides). During the host product development and testing phase 101 and 102, the functionality provided by these modules is simulated by four equivalent Developer Modules 103.

FIG. 2 illustrates, without reference to any particular coding language, the interaction between the Manufacture Modules and the standard host software product. In FIG. 2, the functions not provided by the four Manufacturer modules are provided by the host software product. Thus, the developer of the host software product must know the interface between the host software product and the Manufacturer Modules as well as the function of each module. The actual code used to express the function of the Manufacturer Modules depends upon that of the specific host software product. Minor error handling pathways have been omitted from FIG. 2 to preserve the clarity of the illustration.

The Manufacturer Modules do not directly interface with the user of the host software product. The Manufacturer Modules interface with the user only through the host software product and thus are able to take advantage of the user interface of the host software product.

The initialization code of the host software product is executed 201. The initialization code performs set-up functions necessary for the operation of the specific host software product, and depends on the host software product.

Figure 4:
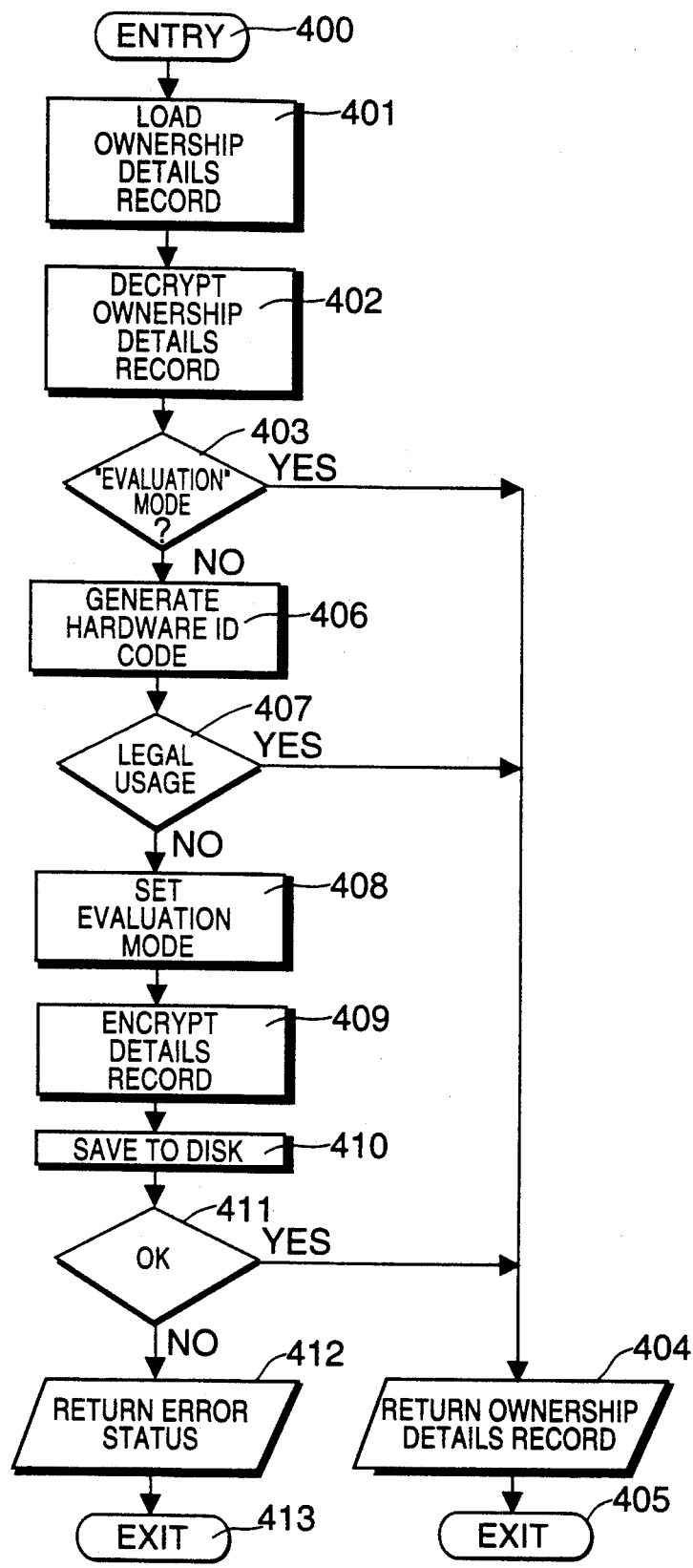
FIG. 4 is a flow chart diagram of the Get User Data Module of FIG. 2.

After the execution of the initialization code 201, the Get User Data Module 400 is called. A purpose of calling this module is to obtain current ownership details of the host software product for subsequent display on the host software product banner page 205. If operating in full-function mode, the Get User Data Module 400 returns an ownership details record containing current ownership details. Once the Get User Data Module has completed its function, control is returned to the host software product. The operation of the Get User Data module is illustrated in FIG. 4.

The Get User Data Module 400 always returns an indication as to whether the host software product is being used by an authorized user. When the Get User Data Module 400 detects unauthorized usage of the host software product, as described below, the host software product will transparently revert from full-function mode to evaluation mode 408 of FIG. 4.

If operating in evaluation mode, the Get User Data Module 400 returns an ownership details record which indicates that the host software product is operating in evaluation mode. In the event that the process of reverting to evaluation mode will be prevented by write-protection of the storage medium on which the host software product is stored, an error status signal is returned (412 of FIG. 4), and the host software product takes this signal 202 and advises the user to write-enable the host software before proceeding 203. Once the user complies with this directive, the Get User Data module is called again.

The operational state of the host software product is saved 204 for future reference (i.e. at step 232). The operational state, as discussed above, of the host software may be either evaluation mode or full-function mode.

After storing the operational state, the banner page of the host software product displays information such as the host software product name, version, a copyright notice, and the operational state of the host software product 205. If the operational state is full-function mode then the name and address details of the current authorized user are displayed; otherwise the banner page indicates that the user is running an evaluation mode copy of the product. The host software product next provides the user with a number of options 206 including (1) executing the host software product (either step 233 or 234 depending on the mode), (2) terminating the host software product's operation by selecting an "exit" function 207, (3) selecting a "new registration" option to enable the user to obtain an Authorization code to operate the host software product in full-function mode 209, and (4) selecting a Recover Backup option 225 for re-activating the host software product if it becomes necessary to restore from a backup copy.

If the user selects the exit function 207, the operation of the host software product including the Manufacture Module is terminated 208 and the user is returned to the operating system environment.

If the user is operating the host software product in evaluation mode and decides that the host software product suits the users requirements, the user may "purchase" the host software product. The user does this by selecting the new registration option 209. A message is displayed advising the user that they are to use a copy of the distribution copy 106 of the host software product 210, and the user must confirm that this has been done 211. (That copy becomes a working copy, which is in evaluation mode.) Without positive confirmation, the Registration process does not proceed. The user is requested to input new user data, such as the user's name, address and telephone number 212.

Figure 3:
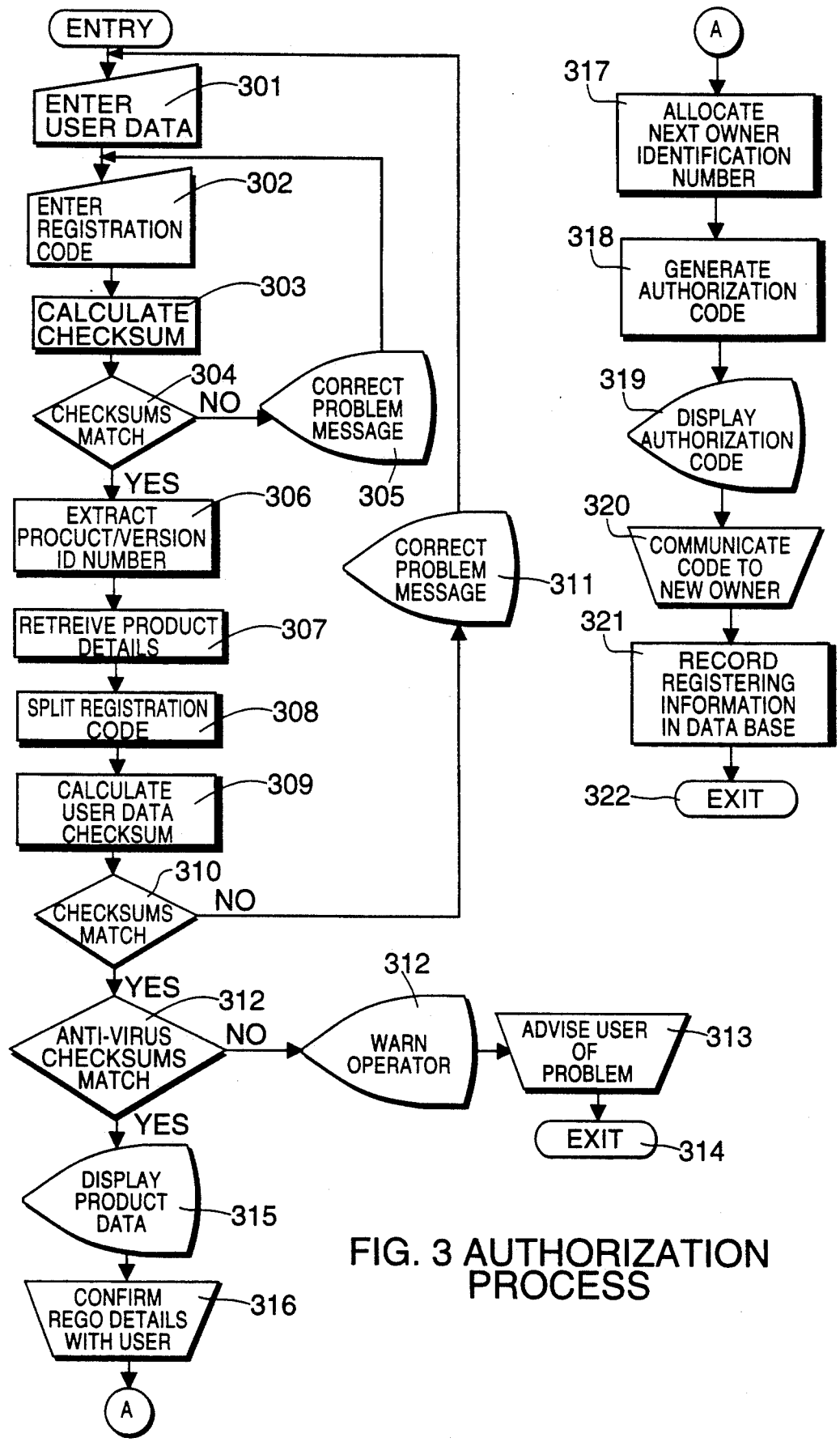
FIG. 3 is a flow chart diagram of the Authorization process of FIG. 1A.

The new user data and a previous ownership details record are passed by the host software product to the Get Registration Code Module 500 to create a registration code for use during the Authorization process (see FIG. 3). However if the new user has failed to provide the requested information, such as the new user's name, address and telephone number (501 of FIG. 5), an error status message is returned (503 of FIG. 5). The host software product acts upon this error status message 213 and a message advising the user to reenter the required information is displayed 214 and the process continues from step 212.

If valid user details were entered 213, the Generate Registration Code Module 500 (as explained below in reference to FIG. 5) will return a registration code to the host software product which is displayed (on the input/output device 12) by the host software product to the user 215.

The registration code displayed 215, together with new user's data, address and phone number is communicated 216 by the user to the Manufacture Control Agency (via, for example, telephone, facsimile, modem 18 and 19 or mail). Subject to satisfactory commercial arrangements, such as, for example, the payment of a fee, the new user will receive an Authorization code. Upon receipt of this Authorization code from the Manufacture Control Agency, the user then inputs the Authorization code 217 using the host software product's interface. Input of the Authorization code enables the full functions of the host software product by converting the operational state to full-function mode, as explained below.

Figure 6:
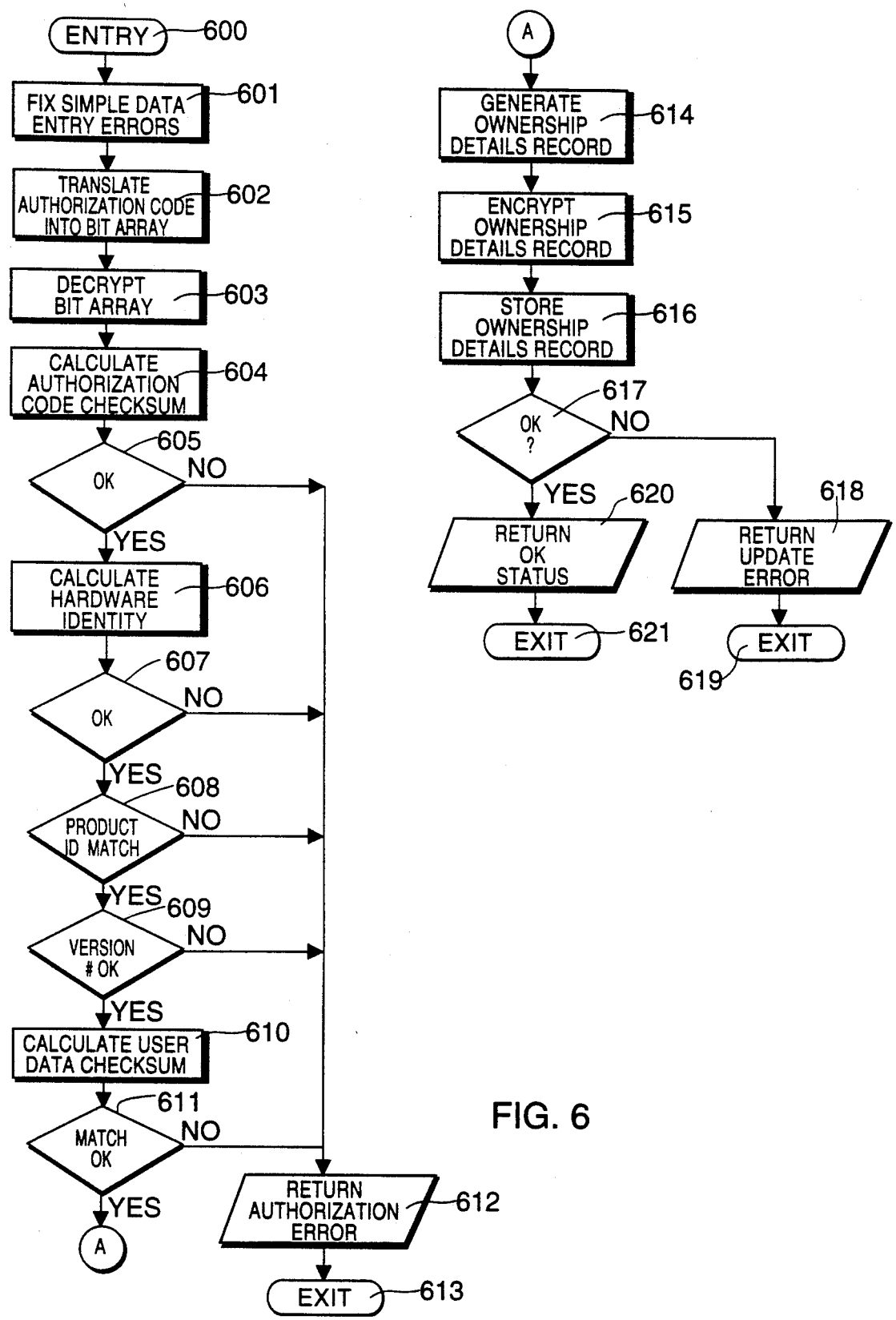
FIG. 6 is a flow chart diagram of the Save Ownership Details Module of FIG. 2.

The entered Authorization Code 217 is passed to the Save Ownership Details module 600 (See FIG. 6). This module stores within the host software product details of the new owner so that when the host software product is used in the future on the same hardware, it will operate in full-function mode. If the Save Ownership Details module 600 completes successfully, a new ownership details record will be returned to the host software product.

The process of updating the new owner details may not proceed if a) the Authorization code is not entered correctly or b) the disk is write protected. If the Save Ownership Details Module 600 returns an error indication 218 (and 612 or 618 of FIG. 6) then the user is advised to ensure that the disk is write enabled and to carefully re-enter the Authorization code 219.

Upon the successful operation 218 of the Save Ownership Details Module 600, a message advises the new owner to insert into the user's disk drive the distribution copy 106 of the host software product. This copy (typically in archived and compressed form) will be in evaluation mode as it is the copy from which the current working copy was created and has not been processed as described above 220. This operation is done so that the host software product stored on the newly inserted disk can be primed to become the backup copy in case the need to restore from the backup media arises. The user is also advised to physically record the Authorization code for safe keeping, as this code will be needed as part of any future recovery process.

The user inserts the distribution copy 106 of the host software product, as advised and records the Authorization code for later reference 221. Control passes to the Prime Backup Module 700 (as explained in detail in reference to FIG. 7). (At this stage, it is still the code of the host software product that is executed by the user's computer; the backup copy is modified but not run at step 700.) On invocation, the Prime Backup Module 700 is passed the new Ownership details record as returned by the Save Ownership Details module 600. The Prime Backup Module 700 transfers the full details of the new ownership to the backup copy. These details are stored in the executable code of the backup copy. However, the backup copy is left in the evaluation mode, and consequently, the user may allow other potential users to copy the backup copy.

The Prime Backup Module 700 may fail if the disk containing the copy of the host software product was not inserted correctly or was write-protected 222. If the prime backup process does fail, an error status is returned (see FIG. 7, 707) and the user is advised to correct the problem before trying again 223.

The host software product's operational state in memory is converted to full-function mode 224. The flow of control continues from step 206.

If at some future time the executable image of the software product is lost or becomes corrupted, the user will need to restore the host software product from the backup copy. The user will first create a copy of the backup copy. This copy, which will be used as a working copy, will be in evaluation mode. In order to restore the working copy to full functionality, the user will need to select the Recover Backup Option 225. If the user selects the Recover Backup Option 225, the user data of the registered owner is displayed 226 and the user is asked to confirm that these details are correct before proceeding 227. If the user data is not correct, the flow of control continues from step 206. The display 226 also advises the user that recovery is best performed when using a copy of the backup copy.

After the user confirms that the user data as displayed on the input/output device 12 is correct and that a working copy is being used 227, the user is asked to enter the Authorization code 228. This is the same authorization code obtained at step 216.

The Authorization code as entered 228 and the ownership details record are then passed to the Save Ownership Details Module 600. If the disk containing the backup copy is write-protected or if the Authorization code was entered incorrectly, the Save Ownership Details Module 600 returns an error indication 612 or 618 of FIG. 6 and the host software product decides 229 to advise the user to correct the problem 230 before trying again.

The operational state in memory of the backup copy is changed to full-function mode 231. The flow of control continues from step 206.

If the user does not select any of the options 207, 209 or 225, the host software product determines 232 what mode it is to operate in by examining the information passed to it by the Get User Data Module 400. If in evaluation mode, the host software product is then run in evaluation mode 233. If in full-function mode, the host software product is then run in full-function mode 234.

Referring now to FIG. 3, there is illustrated in flow chart form the operation of the Authorization process 109 of FIG. 1A. These operations, performed at the Manufacture Control Agency, register a new user of the host software product. In the representative embodiment, the Authorization process 109 is executed by the Manufacture Control Agency's computer processor 15.

When a new user contacts the Manufacture Control Agency in order to register a product, an operator at the Manufacture Control Agency records in the Central Database 112 data about the new user 301. The operator will enter via the input/output device 16 the Registration Code 302 as displayed to the user at step 215 of FIG. 2. The registration code in the representative embodiment is in an alpha-numeric format suitable for communication between the new user and the Manufacture Control Agency (e.g. AAA-999-AAA-999-AAA).

The registration code can be in a format to allow it to be checked for errors. The following is an example of such an error checking process. The registration code as entered at step 302 is converted to an underlying packed array of bits. Some bits contain a checksum, which is extracted and compared with a newly calculated checksum of the bits 303. If the registration code checksum as calculated do not match 304, this indicates that the registration code has been entered incorrectly 304. In this case, the operator is advised of the problem 305 and given the opportunity to re-enter the code.

If the registration code checksum values as calculated do match 304, bit values which represent a Product/version Identification Code are extracted from the registration code 306.

The Product/Version Identification Code 306 is then used as a key to retrieve the details of the product being registered (such as, for example, host software product name, Product Identification Number, version number, a software product specific encryption/decryption key, anti-virus checksum, latest version number and price) 307 from the central database 112.

Using the software product specific encryption/decryption key code as retrieved 307, the registration code is decrypted and then unpacked into its component fields 308. In the representative embodiment, the fields include a user data cross-reference code, a hardware identification code, an anti virus-checksum, and a previous Owner Identification Number.

The user data cross-reference code as extracted 309 is the checksum originally calculated (505 FIG. 5) from the owner data as entered by the user during the registration process (212 FIG. 2). A second checksum based on the user data as entered via the input/output device 16 by the Manufacture Control Agency operator is also calculated 309.

The user data cross-reference code and the second checksum 309 are compared 310. If these do not match it is an indication that the User Data as entered by the Manufacture Control Agency operator 301 does not match the User Details as originally entered by the new user at step 212. There is also a possibility that the mismatch could have resulted from a mis-entry of the Registration Code 302. In the event of a mismatch, an error message is displayed 311 and the operator given the opportunity to correct the data entry problems.

If there is a match 310, the anti-virus checksum as originally calculated during the Franking process (810 FIG. 8) retrieved from the central database 112 is compared with the checksum of the host software product as calculated in the process of generating the registration code (507 FIG. 5) and derived from that registration code 308. If these two checksums do not match 312, it indicates that the host software product has in some way been deliberately or accidentally corrupted. In the event of such corruption the operator is warned 312 to advise the user 313 that the host software product is not suitable for registration and the process is terminated 314.

If the anti-virus checksums match 312, the details of the product (e.g. host software Product Name, Version Number, Price and Latest Version) are displayed 315 so that the Manufacture Control Agency operator can confirm these details with the new user 316.

Next, a new Owner Identification Number is allocated from the next available number in the Manufacture Control Agency's database 317.

After the Owner Identification Number is allocated to the new user 317, an Authorization code is generated 318. The Authorization code is generated using a four step process. In the first step, an authorization record is assembled which contains, in the representative embodiment, the owner data checksum, the host software product identification code, the latest product Version Number, the hardware identification code, the newly allocated Owner Identification Number and a checksum of the authorization record itself. During the second step, the authorization record is packed into a bit array. The mapping between the fields of the authorization record and packed bit array ensures that the minimum number of bits necessary to represent the information content of each field is used. The third step provides for the bit array to be encrypted using the software product specific encryption/decryption key. Finally, in step four, the encrypted bit array is encoded in a format suitable for communication, e.g. "AAA-999-AAA-999-AAA".

The Authorization code is then displayed 319 on the input/output device 16 and the Manufacture Control Agency operator communicates it to the new user 320 and 108b. If the version of the host software product which the new user is registering is older than the latest version of the product which is available, this fact is highlighted to the operator on this display so that the operator can advise the new user that the registration number being provided will also be useable if the user subsequently obtains a copy of a more current version.

To complete the Authorization process, the Manufacture Control Agency updates the Central Database 112 with details of the new registration: e.g. date, name, address, phone number, allocated Owner Identification Number, product identification number, latest product version number, and previous Owner Identification Number.

Referring now to FIG. 4, there is illustrated the Get User Data module 400 of FIG. 2. The Get User Data Module 400 returns an ownership details record to the host software product. The Get User Module 400 is one of the four Manufacturer Modules.

Retrieving the ownership details record enables the host software product to determine the proper operational state (evaluation or full-function) for the use of the host software product. The ownership details record is also necessary so that the name and address of the current registered owner can be displayed on the banner page of all full-function copies 205. This acts as an important deterrent to unauthorized duplication. Further, the ownership information also allows the Owner Identification Number of the previous owner to be tracked when new product registrations are made.

The first step is to load an encrypted ownership details record 401. (The ownership details record is encrypted (at step 806 or 615) using the software product specific encryption/decryption key generated during the Franking Process 104 (as discussed below in relation to step 803). The ownership details record is stored as part of the host software product's code segment (at step 616 FIG. 6).) The ownership details record contains, if operating in full-function mode, details of the registered user. However, if this is the first use of the host software product, an initialized ownership details record originally created as part of the program code segment of the host software product (806 FIG. 8) is loaded to memory. The ownership details record indicates the mode of operation of the host software product.

The ownership details record is decrypted into its respective fields (e.g., owner name, address, phone number, hardware identification code, Owner Identification Number, and an operational state flag which indicates if this copy of the product is evaluation mode or full function mode) 402 using the software product specific encryption/decryption key.

If the host software product is in evaluation mode 403, the ownership details record is returned to the host software product 404 and control returns to step 202 of FIG. 2 405. When the host software product is in evaluation mode, the name, address, phone number and Owner Identification Number fields of the ownership details record will contain information about the previously registered owner. (If this is use of a copy of the host software product which has not previously been through the registration process 108, the ownership details record contains initialized data and sets the mode as evaluation mode: see step 806.) These details will not be displayed on the banner page but are stored in case needed when restoring from a backup copy. The previous Owner Identification Number is used as part of the process of registering a new owner.

If the operational status indicates that the software product is authorized to operate in full-function mode 403, further checking is necessary in order to ensure that the software is still being used on the hardware for which it was authorized. A current hardware identification code is generated 406. The method of generating the hardware identification code is different for each type of computer hardware, and is known in the art. If the hardware provides direct support for a unique machine number then this is used as the basis for the hardware identification code. Alternately, where a unique machine number is not available, but the hardware is operating in a networked environment, then the hardware identification code can be based on the local area network (LAN) address of the computer. If neither a unique machine number nor LAN address is available, then a relatively distinctive hardware identification code is calculated as a checksum ranged over the ROM BOIS of the computer hardware.

After the hardware identification code is generated 406, it is compared 407 with the hardware identification code which was recorded in the ownership details record at steps 614 to 616 of FIG. 6. If the hardware identification codes match, the full-function ownership details record is returned to the host software product 404 and the module returns control to step 202 of FIG. 2 405.

If the hardware identification codes do not match 407, this indicates that the specific software product is being used on computer hardware for which it is not authorized. The operational state of the host software product is changed to evaluation mode 408 and a copy of the resultant ownership details record is re-encrypted using the software product specific encryption/decryption key 409.

Figure 8:
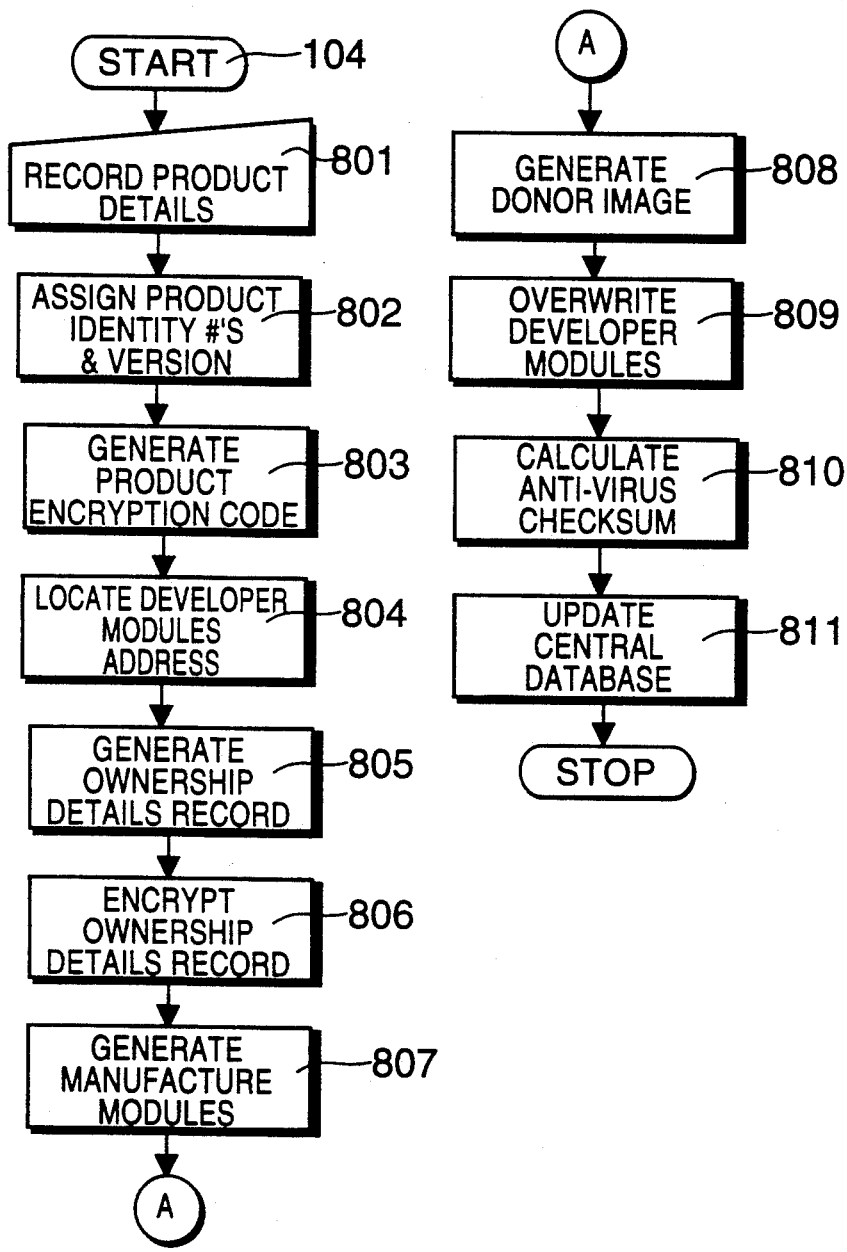
FIG. 8 is a flow chart diagram of the Franking process of FIG. 1A.

After the encrypted ownership details record is generated 409, the host software product is opened for writing at an offset calculated during the Franking process 804 FIG. 8 and the new ownership details record is written to the storage device, in the representative embodiment being a disk, containing the host software product 410.

If this is successful 411 then the module returns an evaluation only ownership details record to the host software product 404 and exits 405.

If, however, the storage device is write-protected, then the down grading of the operational state will fail 411 and the Get User Data Module will return control to the host software product 413 with an error status signal which indicates that the host software product is being used without authorization 412. In this case the host software product will advise the user that the storage device containing the host software product must be write-enabled before proceeding 203 FIG. 2.

Figure 5:
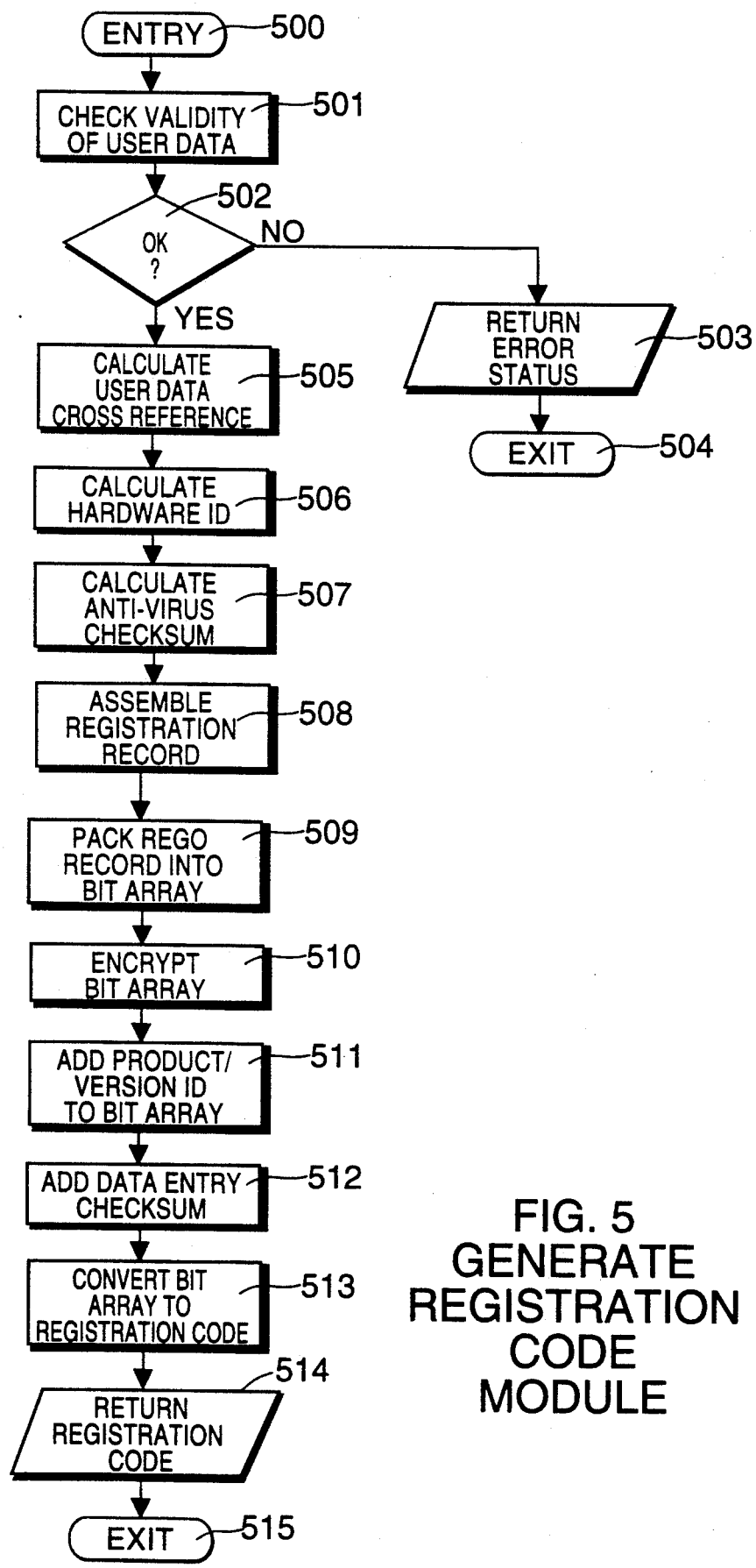
FIG. 5 is a flow chart diagram of the Generate Registration Code Module of FIG. 2.

Referring now to FIG. 5, there is illustrated in flow chart form the process of generating a registration code by the Generate Registration Code Module 500 of FIG. 2. The Generate Registration Code Module 500 is one of the four Manufacturer Modules.

A registration code is used as a concise and reliable method of transferring a set of information from a new user to the Manufacture Control Agency in a manner which is not readily subject to fraudulent abuse (see 302). The registration code also provides for a cross-check on the validity of other information provided by a new user to the Manufacture Control Agency at the time of registration (See FIG. 3). As illustrated in FIG. 2, this module is called by the host software product at step 500. The information passed to the Generate Registration Code Module 500 by the host software product is the new user data and the ownership details record. (The Ownership Details record contains details of the previous authorized user at this stage.)

The generation of a registration code begins with a validity check of the user data 501 as entered 212 FIG. 2. The validity check comprises a simple test of the address field to ensure that the new user has input a suitable number of characters. If the user did not enter at step 212 a suitable number of characters in the address field 502, then an error status message is returned 503 and the registration routine exits 504. This is only a simple first-line check which prevents the new user from attempting to register a software product with a frivolous amount of address information. A far more rigorous check occurs at the time of registration when the Manufacture Control Agency operator scrutinizes the information provided by the new user and the user data cross-check process is performed 310.

If the user data validity check 502 passes, a checksum of the user data is created 505. This checksum will be used during the Authorization process as a cross-reference to validate the user data as communicated to the Manufacture Control Agency 310 FIG. 3. The cross-reference can be a hash value based on only the alphanumeric characters in the user data. (All lower-case letters are converted to upper-case and white space is ignored before the hash value is calculated.)

Next, the hardware identification code is generated 506. The method of generating the hardware identification code is the same as described in step 406 FIG. 4. This code is passed to the Manufacture Control Agency as part of the registration code 216 and returned as part of the Authorization Code for use at the time when the software product undergoes the transformation from evaluation mode to full-function mode 224?? and subsequently every time the product is activated 407. This ensures that the product is being used on the hardware for which it was authorized.

After the hardware identification code is generated 506, an anti-virus checksum of the host software product is calculated 507. This checksum could be calculated, for example, by ranging a "hashing" algorithm across all the executable instructions of the host software product's code. When generating the product checksum, however, that portion of the code where the ownership details record is stored is excluded from the calculations as this data is subject to change. This checksum is used by the Manufacture Control Agency at the time of registration in order to ensure that the copy of the product being registered has not be corrupted in any way. See 312 of FIG. 3.

A registration record is then assembled 508 which contains the user data cross-reference code, the hardware identification code, anti-virus checksum, and the previous owner's Identification Number. The registration record is then packed into a bit array 509 with each field of the record occupying no more bits than is necessary to encode the information content of the field. After the bit array is created 509 it is encrypted 510 using the software product specific encryption/decryption key. Algorithms which pack and encrypt the registration bit array are known in the art. Any one of these many techniques, commonly known in the industry, may be used.

The bits representing the Product/Version Identification code are added to the packed bit array 511. A checksum is then calculated from the bits in the array and added to the packed bit array 512. This checksum will be used by the Manufacture Control Agency to avoid operator data-entry errors 304. The Product/Version Identification code and the data-entry checksum is added after the encryption process 510 as both these details are needed by the Manufacture Control Agency before the registration code can be decrypted.

After the final component is added to the packed bit array 512, it is converted to a form suitable for oral or written communication by the prospective owner to the Manufacture Control Agency 513; for example "AAA-999-AAA-999-AAA" and returned to the host software 514 for display 215 FIG. 2 to the user.

Referring now to FIG. 6, there is illustrated the flow chart diagram of the Save Ownership Details Module 600 FIG. 2. The Save Ownership Details Module 600 is one of the four Manufacturer Modules.

Once the user inputs into the host Software Product the Authorization code received from the Manufacture Control Agency 217 FIG. 2 it is passed to the Save Ownership Details Module 600 and a new ownership details record is created and stored. The ownership details record is stored in the program code segment of the host software product, overwriting the previous ownership details record.

A function of the Save Ownership Details Record module 600 is to check and fix any input error that may have been made by the user when keying in the Authorization code. In the representative embodiment, the following scheme is used. Because many users may fail to distinguish between an "O" (letter) and a "0" (numeral 0) or between an "1" (letter) and a "1" (numeral one), or use lower case where upper case is required, all characters are transposed to a canonical character set 601 which is not sensitive to such mis-entries. By way of example, the Authorization Code is transposed into the format "AAA-999-AAA-999-AAA". All lower case characters are transposed to their upper case equivalents. Any numerical characters representing of zero (0) or one (1) appearing in an "AAA" group are transposed to the letter "O" or letter "L" appropriately. Likewise, the reverse process is performed where a letter "O" or "L" appear in numeric groups.

Once the Authorization code is transposed into a canonical character set 601, it is converted to a packed bit array 602 and decrypted 603 using the software product specific encryption/decryption key.

After the Authorization code is decrypted 603, the packed bit array is unpacked into its component record fields: owner data cross-reference, the software product identification number, the product version number, the hardware identification code, the new Owner Identification Number, and a checksum of the authorization record itself.

The sub-fields of the Authorization code are then checked for validity. The validity checks ensure that the Authorization Code checksum matches a freshly calculated checksum 604 and 605, that the authorized hardware identification code matches the freshly generated hardware identification code 606 and 607, that the authorized product identification number matches the actual product identification number 608 as recorded in the specific software product during the Franking process 608, that the authorized product version number is greater than or equal to the software version number 609 as stored during the Franking process, and that the authorized owner data cross-reference corresponds to the owner data entered by the user 610 and 611. If any of these validity checks fail, the module returns to the host software product 613 and 218 with an authorization error indication 612. (See 218 and 219 of FIG. 2) If the Authorization code validates, a new ownership details record is constructed 614 comprising the new owner data (such as, for example, name, address and telephone number), the newly calculated hardware identification code, the new Owner Identification Number (as obtained from a sub-field of the authorization record), and an operational state field having the value "full-function".

After the new ownership details record is created 614, it is encrypted 615 using the software product specific encryption/decryption key. The encrypted record is then stored in the host software product's program code segment at an address which corresponds to the load address where the ownership details record is stored 616. The offset at which the new ownership details record is written is that determined during the Franking process 804.

If the update is successful 617, control returns to the host software product 621 at step 218 with a success status and the new ownership details record 620. If the storage media which contains the executable code is write-protected then the update process will fail and will return to the host software product 619 with a failure status 618. In this case, the host software product will advise the user to write-enable the disk 219 before proceeding.

Figure 7:
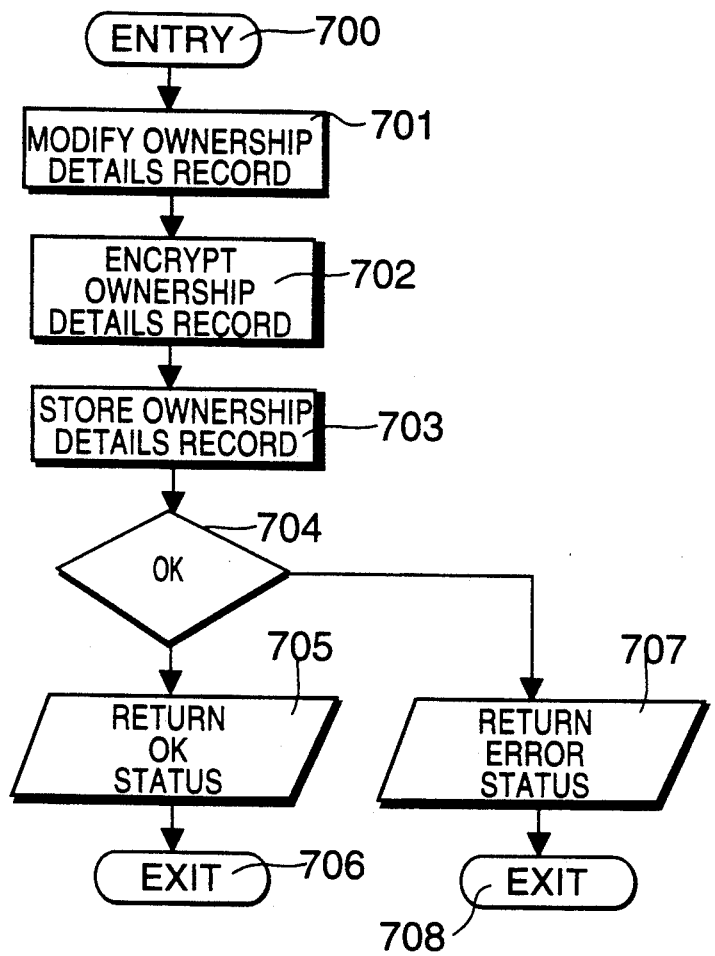
FIG. 7 is a flow chart diagram of the Prime Backup Module of FIG. 2.

Referring now to FIG. 7, there is illustrated the Prime Backup Module 700 of FIG. 2. This module is one of the four Manufacturer Modules.

The Prime Backup Module 700 modifies a copy, for example, the distribution copy 106, of the host software product (to create a backup copy of the host software product in evaluation mode) so that it is suitable both for duplicating to make sample copies of the host software product for other potential users, and for future use in recovering a working copy of the product if necessary.

The Ownership Details Record stored at step 616 of FIG. 6 is used by the Prime Backup Module. The first step is to modify the ownership details record as passed by the calling host software product to set the operational state to evaluation mode 701.

The resultant evaluation mode Ownership Details Record is then encrypted 702 using the software product specific encryption/decryption key and written to the distribution copy at the location of the ownership details record 703 as calculated and stored as part of the Franking process, see 804.

If the update operation is successful 704, the Prime Backup Module 700 returns control to the host software product (more correctly, to the backup copy's copy of the code of the host software product) 706 with a success status 705. If the update operation fails for any reason 704, the Prime Backup Module 700 returns 708 an error status 707. In the case of an error return, the host software product will advise the user of the problem 223 and give the user an opportunity to correct the problem.

Referring now to FIG. 8, there is illustrated in flow chart form the Franking process 104 of FIG. 1A.

The Franking process comprises steps whereby the Developer Modules (preinserted by the software developer 101) are overwritten with Manufacturing Modules by the Manufacturing Control Agency.

Upon the receipt of a host software product by the Manufacture Control Agency from a software developer, the first step of the Franking process carried out by the Manufacture Control Agency is the recording of details about the host software product in the Central Database 112: for example, name, version and accompanying commercial details (e.g. product price, developer name and address etc.) 801. The host software product is assigned two identification numbers 802. The first number, a Product Identification Number, uniquely identifies the product and the second, a Product/Version Identification Code, identifies the specific product/version combination. If an earlier version of the product has already been manufactured, a new product identification number is not issued as the former product identification number is retained. The identification numbers together with the product details are stored in the Manufacture Control Agency's central database 112 for later reference. In particular, it is during the registration process 108 that the product identification will be used by the Manufacture Control Agency as a key when automatically retrieving other details of the specific software product being registered by a prospective user 306 and 307.

After the assignment of the product identification numbers 802, each host software product is assigned its unique software product specific encryption/decryption key 803. The software product specific encryption/decryption key is computer generated at random and cross-referenced with the Manufacture Control Agency's Central Database 112 to ensure that no duplication of keys exists. If a duplication of key occurs, a new key is generated and again cross-referenced with the database until there is no duplication with an existing software product specific encryption/decryption key.

Once the software product specific encryption/decryption key has been generated 803, the host software product is scanned to locate a signature sequence of bytes existing in the executable code of the developer modules 804. Locating the signature sequence of bytes in the executable file permits the Manufacturing Control Agency to determine the relative location of the Developer Modules and, therefore, the target locations to overwrite the Developer Modules with the Manufacture Modules and the target location at which ownership details record is stored.

As the host software product can be distributed in a compressed form, it may also be necessary to locate the future position of the ownership details record within the compressed distribution copy of the host software product for use during the Prime Backup process 703. To achieve this, the host software product is compressed on a trial basis and the offset within the compressed output stream which corresponds to the start of the ownership details record is recorded.

The contents of the ownership details record are initialized 805 to a state which is suitable for inclusion in the initial seed copies of the host-software product. In particular, the operational state is set to indicate that the host software product is not yet authorized to operate in full-function mode. The operational state, stored as part of the ownership details record in the host software product's code, is used at step 403, as discussed above, to determine the mode of operation of the host software product.

Once the initial ownership details record is generated, it is encrypted 806 using the software product specific encryption/decryption key and written out as high order language source code in a series of data definition statements for inclusion within the subsequent compilation of the Manufacture Modules 807.

The customized Manufacture Modules are generated from source code 807 which is parameterized to accept variable definitions for the following data: the host software Product Identification Number, the Product/Version Identification Code, the version number, the software product specific encryption/decryption key, a target offset within the host product's executable of the Manufacture Modules, and the target offset of the ownership details record within the compressed distribution copy, and the target offset of the ownership details record within the uncompressed working copy. The Manufacture Modules's source code is compiled with the supplied parameters to create a single object module. That object module is then linked with a standard skeleton set of host modules to create a donor executable image 808.

The Manufacture Modules and the Developer Modules contain certain assembly code instructions, the purpose of which is to ensure that (1) both the code and data of the Manufacture Modules are stored at adjacent memory addresses within the code segment of the host software product; (2) the entry points of the four modules which are directly callable from the host software product are at the same memory addresses in both the Developer Modules and the Manufacture Modules (this is typically achieved through the use of a jump table); and (3) the Manufacture Modules are self contained in that they do not call any functions or subroutines within the body of the host software product.

It is also important in the generation of the customized Manufacture Modules that the resultant code as inserted in a number of different host software products does not contain common instruction sequences which could act as a signature sequence around which hackers might base code to defeat the security of the system. Accordingly, the sequence in which the component routines of the Manufacture Modules are combined to produce the object module is randomized and the modules themselves are periodically re-written while preserving the underlying algorithm.

The donor executable image as generated in step 808 contains the Manufacture Modules at a known location within the image. The executable image is then opened for reading and positioned at the beginning of the Manufacture Modules. The specific host software product to be franked is opened for writing at the beginning of the Developer Modules as determined earlier 804. The bytes of the Developer Modules are then overwritten 809 with the bytes of the full Manufacture modules. The Developer Modules contain sufficient bytes to ensure that the overwriting process does not encroach beyond address space reserved by the Developer Modules. Any space within the Developer Modules is padded out with random data. Upon completion of the overwrite of the Manufacture Modules, the files are closed.

A compressed version of the host software product's executable image can be created. The compressed version is created with specialized software which compresses the executable image using a compression format well known in the industry. The format must be one which supports uncompressed sequences of bytes within the compressed file. The specialized software ensures that the bytes of the executable image which contains the encrypted ownership details record are not stored in a compressed form. This is to make sure that the Prime Backup process can simply write the new ownership details record to the distribution copy 106.

An anti-virus checksum is then calculated 810, for example, by passing the host software product's executable instructions through a "hashing" algorithm. The host software product checksum is calculated across all executable instructions of the host software product's code. When generating the anti-virus checksum, however, that portion of the code where the ownership details record is stored is excluded from the calculations as this data is subject to change. Code within the Manufacture Modules themselves will re-calculate this code checksum at the time of the Registration process (507 FIG. 5) so that the Manufacture Control Agency can confirm that the host software product has not been deliberately or accidentally corrupted.

With the calculation of the anti-virus checksum 810, the Franking process is completed by recording the product checksum 810 and the software product specific encryption/decryption key 803 in the Manufacture Control Agency's Central Database 112, for later use during the Authorization process (FIG. 3).

Figure 9:
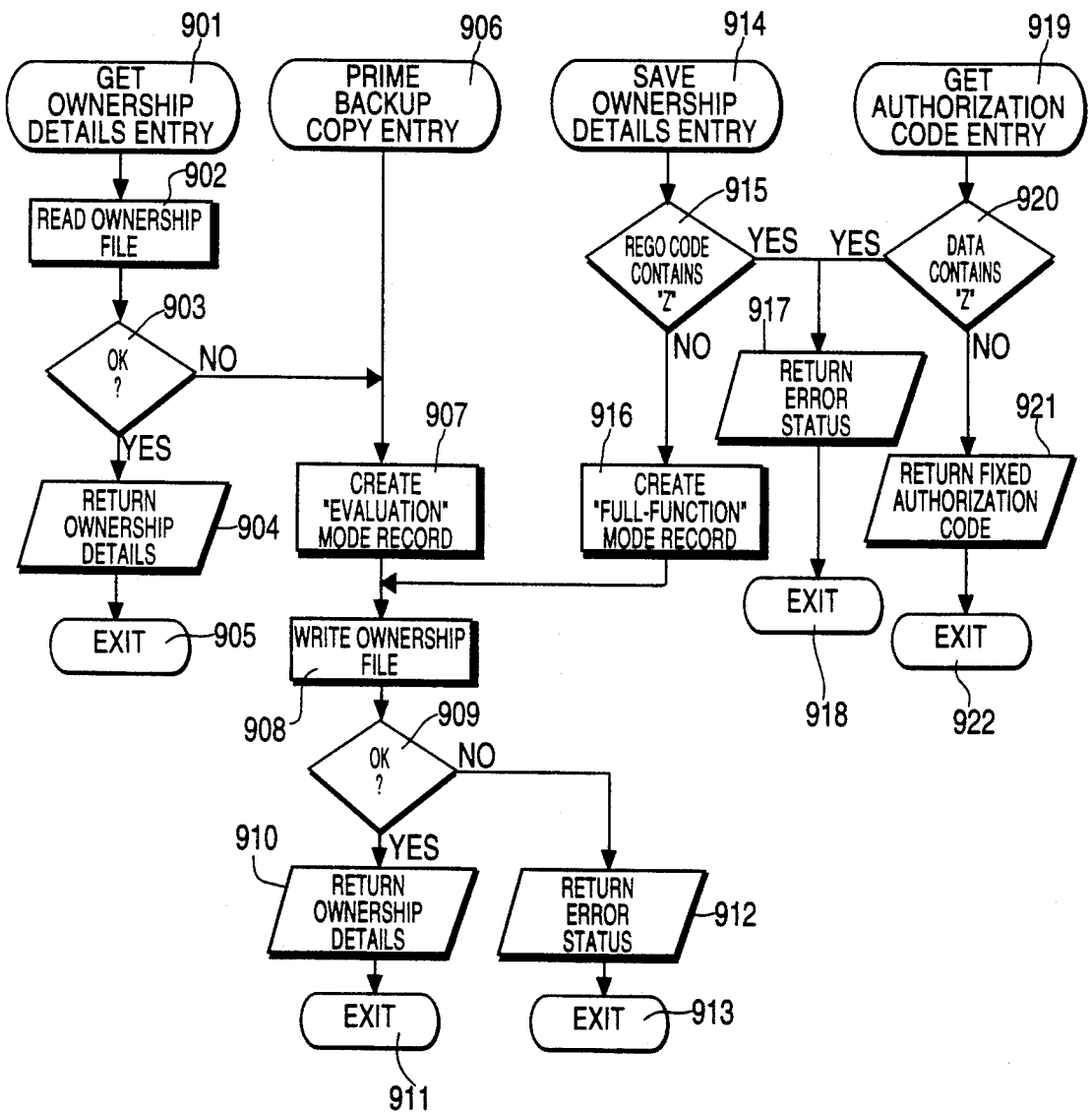
FIG. 9 is a flow chart diagram of the Developer Modules of FIG. 1A.

Referring now to FIG. 9, there is illustrated the Developer Modules 103 of FIG. 1A.

The Developer Modules 103 are provided to allow developers to simulate the operation of the Manufacture Modules during the product development and testing phases 101 and 102. The Developer Modules are not complex. Unlike the Manufacture Modules, there is no bit packing and unpacking, no encryption and decryption, and the complex process of updating the executable image is avoiding by the simple expedient of storing the ownership details in an ancillary file. The Developer Modules reserve sufficient address space for their subsequent replacement by the Manufacture Modules and the Developer Modules also contain a signature sequence by which their placement within each product can be located.

The Get Ownership Details Record process is simulated first by reading the ancillary file which contains the ownership details record 902. If the record is read correctly 903 it is returned to the calling host software product 904. If the record input fails 903 a blank "evaluation-model" record is created 907 and written back 908.

The Save Ownership Details module 600 is simulated starting at entry point 914. The developer can simulate the incorrect entry of an Authorization code simply by including a predefined error code, such as a "Z", when entering the code. Thus, if a "Z" is included 915, an error status 917 will be returned. Otherwise a "full-function" ownership details record based on the owner data supplied is created 916. The ownership details record is stored in a separate file 908. If the update to the ancillary file is successful, the ownership details are returned 910. If the update fails, an error status is returned 912.

Simulation of the Prime Backup Module 700 starts at the entry point 906. An "evaluation-model" record is created from the ownership details supplied 907. The ownership details record is stored in a separate file 908. If the update to the ancillary file is successful the ownership details are returned 910. If the update fails an error status is returned 912.

Simulation of the Get Authorization Code starts at the entry point 919. The developer can simulate the incorrect entry of user data by simply including a code, such as a "Z", when entering the user address field. Thus, if a "Z" is included 920 an error status 917 will be returned. If the user address field does not contain a "Z", an Authorization Code will be returned 921 to the host software product. However, as this is only for test purposes, the code returned is always the same.

Referring now to FIG. 10, there is illustrated an example table structure of the Central Database 112 of FIG. 1A. The Central Database 112 is operated by the Manufacture Control Agency and is accessed by the Manufacture Control Agency during the Franking Process 104 and the Authorization Process 109.

In the representative embodiment, there are five tables, 1001 to 1005, namely, a developer table 1001, a product table 1002, a version table 1003, a license table 1004 and an owner table 1005.

The developer table 1001 contains information about each developer of host software products recognized by the Manufacture Control Agency.

The product table 1002 contains information about each host software product received by the Manufacture Control Agency, recorded at step 801.

The version table 1003 contains information about each version of each host software product and is accessed by the Manufacture Control Agency at step 307.

The license table 1004 contains information listing the authorized users for each host software product. It also contains information as to from whom the authorized user obtained the host software product. Each entry in the license table 1004 is made at step 321.

The owner table 1005 contains detailed information about each authorized user recognized by the Manufacture Control Agency. Each entry in the owner table 1005 is given to the Manufacture Control Agency at step 301.

What is claimed is:

1. A system to create and control the use of an informational product stored on a storage medium, the informational product operatable in a plurality of modes including a first mode and a second mode, the mode of operation being stored in an ownership details record of the informational product, the system comprising:
    a first processor ascertaining if the mode of operation of the informational product is the first mode or the second mode by accessing an ownership details record stored in the informational product each time the informational product is activated, the ownership details record initially set to the first mode, and when them ode of operation of the informational product is ascertained to be the first mode, generating a registration code for a user of the informational product, the registration code comprising a previous user part to identify a previous user of the informational product; and
    a second processor, accepting as input the registration code, allocating a unique user code to the user of the informational product, and generating a unique authorization code, the authorization code being a function of the registration code and the user code;
    wherein, the first processor, responsive to accepting as input the authorization code and thereafter determining the validity of the authorization code, and if the authorization code is valid, changing the mode of operation of the informational product from the first mode to the second mode.

2. The system of claim 1 wherein the registration code further comprises a first processor identification part, a user identification part, an informational product identification part and a check-sum part.

3. The system of claim 1 wherein the registration code further comprises a firs processor identification part.

4. The system of claim 1 wherein the registration code further comprises a user identification part.

5. The system of claim 1 wherein the registration code further comprises an informational product identification part.

6. The system of claim 1 wherein the registration code further comprises a check-sum part.

7. The system of claim 1 wherein the authorization code is further a function of the identity of the first processor, the user description part, the identity of the informational product and a version number of the informational product.

8. The system of claim 1 wherein the authorization code is further a function of the identity of the first processor.

9. The system of claim 1 wherein the authorization code is further a function of the user description part.

10. The system of claim 1 wherein the authorization code is further a function of the identity of the informational product.

11. The system of claim 1 wherein the authorization code is further a function of a version number of the informational product.

12. The system of claim 1 wherein the first mode is an evaluation m ode and the second mode is a full-function mode.

13. The system of claim 1 wherein the first processor further comprises means for creating a reproduction of the informational product.

14. The system of claim 13 wherein the reproduction of the informational product is stored on the storage medium in a compressed form.

15. The system of claim 1 wherein the first processor further comprises means for storing in the informational product the identity of the first processor and the user description part.

16. The system of claim 1 wherein the informational product comprises means for selecting evaluation mode if the informational product is not executed by the first processor.

17. The system of claim 1 wherein the informational product is a computer software program.

18. The system of claim 1 wherein the storage medium is a disk.

19. The system of claim 1 further comprising a central database coupled to the second processor, the central database to store the identity of the informational product, a user code and a previous user part.

20. The system of claim 1 wherein the first processor is coupled to the second processor by a modem.

21. A programmable processor to authorize the use of an informational product stored on a storage medium, the informational product including a user record and operatable in a plurality of modes by the programmable processor, the operational modes comprising a full-function mode and an evaluation mode, the operational modes being stored in the user record, the informational product initially operating in the evaluation mode, the programmable processor comprising:

means for examining the user record each time the informational product is activated;

means for determining the operational mode of the informational product as a function of the operational mode stored in the user record and the identity of the processor on which the informational product is executed;

means for generating a registration code for a user of the informational product when the operational mode of the informational product is determined to be the evaluation mode, the registration code being a function of the identity of the programmable processor, the identity of the user and the identity of the informational product;

means for accepting the registration code as input at a second processor;

means for generating an authorization code at the second processor;

means for accepting as input the authorization code; and means for performing a verification function to verify the authorization code, and if the verification is successful, changing the operational mode of the informational product to full-function mode, and thereafter storing in the informational product a user record comprising the identity of the user, the identity of the programmable processor and the operational mode.

22. The programmable processor of claim 21 further comprising means for accepting as input the registration code and thereafter generating a unique authorization code as a function of the registration code.

23. The programmable processor of claim 21 further comprising means for creating a backup copy being a copy of the informational product in evaluation mode and for storing therein a user record.

24. The programmable processor of claim 23 further comprising means for receiving from the user the authorization code and for inputting the authorization code to enable the backup copy of the informational product to operate in full-function mode.

25. The programmable processor of claim 21 wherein the informational product is a computer software program.

26. The programmable processor of claim 21 wherein the storage medium is a disk.

27. The programmable processor of claim 21 wherein the programmable processor is coupled to the second processor by means of a modem.

28. The system of claim 13 wherein the first processor further comprises means for setting the mode of operation of the reproduction of the informational product to the first mode and storing the mode of operation in the ownership details record in the reproduction of the informational product.

29. The system of claim 1 wherein the first processor further comprises means, activated after the first processor accepts the input of the authorization code, for decoding the authorization code to obtain an owner identification number.

30. The system of claim 1 wherein the first processor further comprises means for storing the mode of operation in the ownership details record in the informational product.

31. A method to authorize and control the user of an informational product stored on a stored medium, the informational product being executed by a first processor and operatable in a plurality of modes including a first mode and a second mode, the method comprising the steps of:
- at the first processor, providing an ownership details record that includes the mode of operation of the informational product, the ownership details record being stored in the informational product;
- at the first processor, accessing an ownership details record stored in the informational product each time the informational product is activated;
- at the first processor, ascertaining if the mode of operation of the informational product is the first mode or the second mode by examining the ownership details record;
- if the mode of operation of the informational product is the second mode, enabling a user to operate all functions of the informational product at the first processor; and
- if the mode of operation of the informational product is the first mode, enabling the user to operate a predefined set of functions of the informational product at the first processor so as to evaluate the informational product and, if requested by the user, (i) generating, when requested by the user, a registration code at the first processor, (ii) at a second processor, accepting as input the registration code, (iii) at the second processor, allocating a unique user code to the user of the informational product, (iv) at the second processor, generating a unique authorization code, the authorization code being a function of the registration code and the user code, (v) providing the authorization code to the first processor, (vi) at the first processor, accepting as input the authorization code, (vii) at the first processor, determining the validity of the authorization code, and (viii) at the first processor, changing the mode of operation of the informational product from the first mode to the second mode if the authorization code is valid.

32. The method of claim 31 wherein the first mode is an evaluation mode and the second mode is a full-function mode.

33. The method of claim 31 further comprising the steps of:
- making a copy of the informational product;
- inserting the ownership details record in the copy of the informational product; and
- modifying the ownership details record so that the copy of the informational product operates in the first mode.

34. The method of claim 31 wherein the registration code comprises a previous user part to identify a previous user of the informational product.

35. The method of claim 31 wherein the registration code comprises a check-sum part and at least one of: a first processor identification part, a user identification part, and an informational product identification part.

36. The method of claim 31 wherein the authorization code is further a function of the identity of the first processor, the suer description part, the identity of the informational product and a version number of the informational product.

37. The method of claim 36 further comprising the steps of:
- determining if the informational product is being executed by the first processor; and
- setting the mode of operation to the first mode if the informational product is not being executed by the first processor.

38. The method of claim 31 further comprising the step of storing the mode of operation in the ownership details record.

39. The method of claim 31 further comprising the steps:
- decoding the authorization code to obtain a user identification code; and
- storing a user identification code in the ownership details record.

40. The method of claim 31 wherein the informational product is a computer software program.

41. The method of claim 31 wherein the informational product is a database.

42. The system of claim 13 wherein the first mode is an evaluation mode and the second mode is a full-function mode, and wherein the first processor comprises means, if a reproduction is made of the informational product, for causing the reproduction of the informational product to initially operate in evaluation mode.

43. The system of claim 42 wherein the first processor further comprises means for retrieving ownership information from the ownership details record of the reproduction of the informational product, causing said ownership information to be displayed on an input/output device coupled to the first processor, and means for accepting as input the authorization code and thereafter determining the validity of the authorization code, the first processor changing the mode of operation of the reproduction of the informational product form evaluation mode to full-function mode if the authorization code is valid.

* * * * *